United States Patent
Kakuda et al.

(10) Patent No.: US 6,700,471 B2
(45) Date of Patent: Mar. 2, 2004

(54) FIXING DEVICE OF CURRENT TRANSFORMER

(75) Inventors: Nobuyuki Kakuda, Hitachi (JP); Kouichi Koyama, Hitachi (JP); Manabu Takamoto, Hitachi (JP); Masahiro Shimokawa, Juo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/246,526

(22) Filed: Sep. 19, 2002

(65) Prior Publication Data

US 2003/0098765 A1 May 29, 2003

(30) Foreign Application Priority Data

Nov. 27, 2001 (JP) ....................... 2001-360982

(51) Int. Cl.[7] .............................................. H01F 38/20
(52) U.S. Cl. .................... 336/174; 336/65; 336/198; 336/90
(58) Field of Search .......................... 336/65, 174, 198, 336/192, 90, 92

(56) References Cited

U.S. PATENT DOCUMENTS 5,001,599 A * 3/1991 Itou et al. .................. 361/604
6,259,051 B1 * 7/2001 Tanimizu et al. ........... 218/120

FOREIGN PATENT DOCUMENTS

| JP | 51-145837 | | 12/1976 |
|---|---|---|---|
| JP | 52-32544 | | 3/1977 |
| JP | 62-260516 | | 11/1987 |
| JP | 2000-37009 | | 2/2000 |
| JP | 2001045620 | A * | 2/2001 |
| JP | 2002281618 | A * | 9/2002 |

* cited by examiner

*Primary Examiner*—Anh Mai
(74) *Attorney, Agent, or Firm*—Mattingly, Stanger & Malur, P.C.

(57) ABSTRACT

A current transformer fixing device comprises a current transformer cylinder surrounding the periphery of a central conductor to be connected to an electric power line, a cylindrical container surrounding the outer peripheral side of a current transformer arranged on the outer peripheral side of the current transformer mounting cylinder and containing the current transformer, a transformer mounting plate connecting the bottom side of the current transformer mounting cylinder and the bottom side of the cylindrical container to each other and restricting axial movement of the current transformer, a sealing flange connected to the upper end of the cylindrical container with a gap between the sealing flange and the upper end of the current transformer mounting cylinder, and fixing bolts fastened to the sealing flange in an axial direction of the conductor and restricting axial movement of the current transformer.

6 Claims, 1 Drawing Sheet

FIXING DEVICE OF CURRENT TRANSFORMER

BACKGROUND OF THE INVENTION

This invention relates to a fixing device of a current transformer and, more particularly, to a current transformer fixing device which is suitable for fixing a current transformer contained inside a gas-insulated switchgear container to a surrounding portion of a conductor.

Hitherto, in the case of fixing a current transformer contained inside a gas-insulated switchgear container, such a construction is employed that a cylindrical current transformer is arranged, through an insulating packing, on an outer peripheral side of a current transformer mounting cylinder arranged on an outer peripheral side of a central conductor connected to an electric power line, a cylindrical container is arranged on the outer peripheral side of the current transformer, an axial end of the current transformer mounting cylinder and an axial end of the container are connected to each other through a current transformer mounting plate, an insulating packing is inserted between the current transformer mounting plate and the current transformer, a bottom side of the current transformer is supported by the current transformer mounting plate, an annular sealing flange is mounted on the other axial end of the container, a gas path is formed by providing a gap between the an inner peripheral side of the sealing flange and the other axial end of the current transformer mounting plate, the sealing flange and the current transformer mounting plate are mounted on a cylindrical tank which is a container of the gas-insulated switchgear, current transformer fixing bolts are mounted on a fixing member mounting seat fixed to an inner peripheral side of the container, and tip ends of the current transformer fixing bolts are pressed on an upper portion of the current transformer through a current transformer presser plate and the insulating packing, thereby to restrict axial movement of the current transformer and to prevent deviation by rotation.

In the conventional current transformer fixing device, the fixing member mounting seat is provided on the inner side of the container arranged on the outer peripheral side of the current transformer, and the current transformer fixing bolts are fastened on the fixing member mounting seat, so that an accommodation space between the upper side of the current transformer and the sealing flange is restricted, whereby it is difficult to make the size of apparatus small. Further, in order to avoid interference with the fixing member mounting seat during working of accommodation of the current transformer into the container, it is necessary to make the outer diameter of the current transformer smaller than the size of an inner surface of the fixing member mounting seat, whereby a radial space of the container is also limited and it is necessary to make the diameter of the container larger when a large sized current transformer is accommodated.

Further, since the container surrounding the current transformer becomes larger than the other container in general, making the size of the container larger restricts reduction of the gas-insulated switchgear.

SUMMARY OF THE INVENTION

An object of the present invention is to provide a current transformer fixing device which is able to reduce a space for accommodating a current transformer, and a gas-insulated switchgear provided with the current transformer fixing device.

To attain the object, a current transformer fixing device according to the present invention comprises a first cylindrical body surrounding the periphery of a conductor to be connected to an electric power line; a second cylindrical body surrounding the outer peripheral side of a current transformer arranged on the outer peripheral side of the first cylindrical body and containing the current transformer; an annular mounting plate connecting an axial end of the first cylindrical body and an axial end of the second cylindrical body to each other and restricting axial movement of the current transformer; an annular flange connected to the other axial end of the second cylindrical body with a gap between the annular flange and the other axial end of the first cylindrical body; and a fastening member fastened to the annular flange in an axial direction of the conductor and restricting axial movement of the current transformer.

When the above-mentioned current transformer fixing device is constructed, the following factor or factors can be added.

(1) A first container surrounding the periphery of the conductor and connected to the annular mounting plate and containing therein an insulating gas, and a second container surrounding the periphery of the conductor, connected to the annular flange and containing therein the insulating gas are provided further.

(2) An annular presser plate is arranged between the fastening member and the current transformer.

(3) Insulating packing is arranged between the current transformer and the annular mounting plate, between the current transformer and the first cylindrical body, and between the current transformer and the annular mounting plate.

(4) An air-tight surface is formed between the second container and the annular flange by connecting them, and the fastening member is arranged a position closer to the first cylindrical body than the air-tight surface.

Further, a gas-insulated switchgear according to the present invention, which has a switch arranged in an insulating gas atmosphere for opening and closing a circuit according to signals from a current transformer, and which any of the current transformer fixing devices as mentioned above is provided as a fixing device for fixing the above-mentioned current transformer to a surrounding portion of the above-mentioned conductor.

According to the above-mentioned construction, since the fastening member is mounted on the annular flange, it is possible to make narrow the space between the current transformer and the annular flange, to reduce the accommodation space of the current transformer, to accommodate the current transformer without making the diameter of the second cylindrical body large, and to contribute to reduction of the apparatus. Further, since any member is unnecessary for fixing the fastening member to the second cylindrical body, it is possible to reduce the number of parts.

DESCRIPTION OF EMBODIMENT OF THE INVENTION

Figure 1:
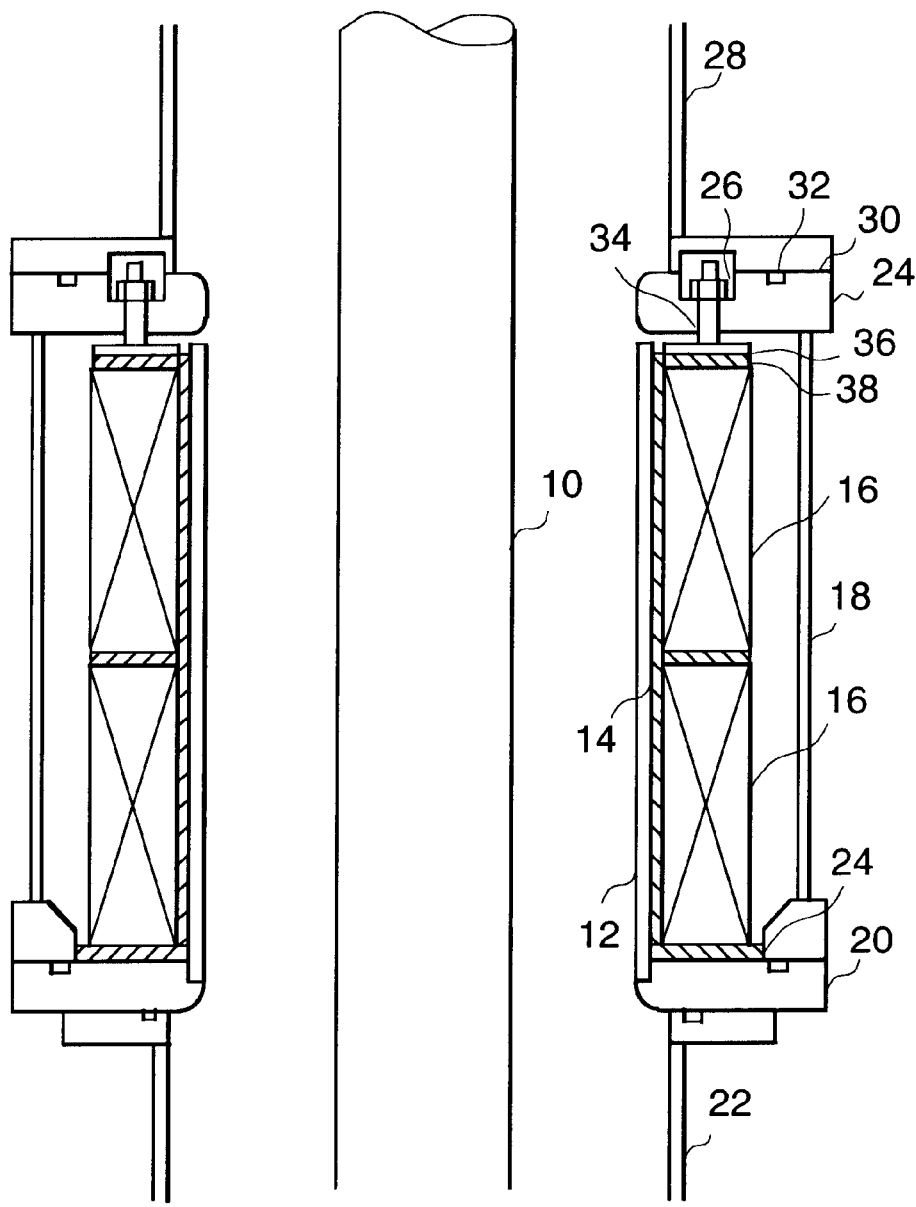
FIG. 1 is a vertical sectional view of a current transformer of an embodiment of the present invention.

An embodiment of the present invention will be described hereunder, referring to FIG. 1 which shows a current transformer of an embodiment of the present invention.

In FIG. 1, a current transformer mounting cylinder 12 as a first cylindrical body is arranged around a central conductor 10 disposed inside a gas-insulated switchgear container and connected to an electric power line. Two current transformers 16 are separated vertically from each other and arranged vertically on the outer peripheral side of the current transformer mounting cylinder 12 through insulating packing 14. Each of the current transformers 16 is provided with a coil winding (not shown) wound on the outer periphery of the current transformer mounting cylinder 12, and the terminal ends of the coil winding are connected to a controller for operating a switch (not shown). A container 18, which is formed in an approximately cylindrical shape as a second cylindrical body for accommodating each current transformer 16, is arranged on the outer peripheral side of each current transformer 16. An axial end of the container 18 and an axial end of the current transformer mounting cylinder 12 are connected to each other through a current transformer mounting plate 20. The current transformer mounting plate 20 is formed in an annular shape as an annular mounting plate and disposed on the axial end of the current transformer mounting cylinder 12. That is, a spacial portion between one axial end side of the current transformer mounting plate 12 and one axial end side of the container 18 is choked up with the current transformer mounting plate 20.

Further, the current transformer mounting plate 20 is connected to a tank 22 as a first container. The tank 22 is constructed as a container for the gas-insulated switchgear, the central conductor 10 is accommodated inside the tank 22 and an insulating gas is enclosed and sealed. An insulating packing 24 which is shaped in annulus ring is mounted between the lower side current transformer 16 and the current transformer mounting plate 20, the lower side current transformer 16 is supported by the current transformer mounting plate 20 through the insulating packing 24, whereby axial movement of the current transformer 16 is restricted.

On the other hand, an annulus ring-shaped (air-tight) sealing flange 24 is connected to the container 18 at the other side end, and has, on the upper side thereof, a plurality of mounting holes 26 formed separately along a circle the center of which is at the central conductor 10. The sealing flange 24 is arranged with a gap between the sealing flange 24 and the other axial end of the current transformer mounting cylinder 12. That is, an insulating gas path is formed between the sealing flange 24 and the current transformer mounting cylinder 12, which prevents a closed circuit from being formed by contact of the current transformer mounting cylinder 12 and the sealing flange 24. Further, a tank 28 which is formed as a second container is connected on the upper side of the sealing flange 24. An air-tight surface 30 is formed between the tank 28 and the sealing flange 24, and an O-ring 32 is inserted and secured at the air-tight surface 30. The tank 28 is formed as the gas-insulated switchgear container and so as to contain therein the central conductor 10 and filled with the insulating gas.

Fixing bolts 34 as fastening members are mounted in the mounting holes 26 formed at positions closer to the central conductor 10 than the air-tight surface 30 of the sealing flange 24. On the tip sides of the bolts 34, a current transformer presser plate 36 as an annulus ring-shaped presser plate is arranged, and an insulating packing 38 is inserted and mounted between the current transformer presser plate 36 and the current transformer 16. That is, by fastening the fixing bolts 34, the tip sides of the fixing bolts 34 press the presser plate 36, restrict axial movement of the current transformer 16 and prevent the current transformer 16 from being deviated in rotation.

Under the condition that each current transformer 16 of the above-mentioned construction is arranged around the central conductor 10, current flows in the central conductor 10, and when the current flow goes beyond a set value, the switch arranged in the atmosphere of insulating gas is opened.

When each current transformer 16 is fixed around the central conductor 10 by using the current transformer fixing device of the above-mentioned construction, the fixing bolts 34 are fastened to the sealing flange 24 and the current transformer presser plate 36 are supported by the fixing bolts 34, so that it is possible to effectively use the space formed between the current transformer 16 and the sealing flange 24, that is, a space on the axial side of the container 18 and a space on a radial side of the container 18, and it can be contributed to reduction of the accommodation space. Further, since any member for fixing the fixing bolts 34 on the inner side of the current transformer 18 becomes unnecessary and it is possible to reduce the number of parts.

As explained above, according to the present invention, since the fastening member is mounted on the annular flange, it is possible to make narrow the space between the current transformer and the annular flange, to reduce the accommodation space of the current transformer, to accommodate the current transformer without making the diameter of the second cylindrical body large and to contribute to reduction of the apparatus.

What is claimed is:

1. A current transformer fixing device comprising:
    a first cylindrical body surrounding the periphery of a conductor to be connected to an electric power line;
    a second cylindrical body surrounding the outer peripheral side of a current transformer arranged on the outer peripheral side of said first cylindrical body and containing said current transformer;
    an annular mounting plate connecting an axial end of said first cylindrical body and an axial end of said second cylindrical body to each other and restricting axial movement of said current transformer;
    an annular flange connected to the other axial end of said second cylindrical body with a gap between said annular flange and the other axial end of said first cylindrical body; and
    a fastening member fastened to said annular flange in an axial direction of said conductor and restricting axial movement of said current transformer.

2. The current transformer fixing device according to claim 1, further comprising:
    a first container surrounding the periphery of said conductor, connected to said annular mounting plate and containing therein an insulating gas; and
    a second container surrounding the periphery of said conductor, connected to said annular flange and containing therein the insulating gas.

3. The current transformer fixing device according to claim 1, wherein an annular presser plate is arranged between said fastening member and said current transformer.

4. The current transformer fixing device according to claim 1, wherein insulating packing is arranged between said current transformer and said annular mounting plate, between said current transformer and said first cylindrical body, and between said current transformer and said annular mounting plate.

5. The current transformer fixing device according to claim 1, wherein an air-tight surface is formed between said second container and said annular flange by connecting said second container and said annular flange, and said fastening member is arranged at a position closer to said first cylindrical body than said air-tight surface.

6. A gas-insulated switchgear having a switch arranged in an insulating gas atmosphere for opening and closing a circuit according to signals from a current transformer, wherein the current transformer fixing device according to claim 1 is provided.

* * * * *